United States Patent [19]

Hepp

[11] Patent Number: 5,777,954
[45] Date of Patent: Jul. 7, 1998

[54] HYDROPHONE STREAMER HAVING WATER-BASED FILL FLUID AND METHOD OF MANUFACTURE THEREOF

[75] Inventor: John Stephen Hepp, Irving, Tex.

[73] Assignee: Hydroscience Technologies, Dallas, Tex.

[21] Appl. No.: 801,947

[22] Filed: Feb. 14, 1997

[51] Int. Cl.[6] ................................................ G01V 1/38
[52] U.S. Cl. ................................. 367/20; 174/101.5
[58] Field of Search .................... 367/20, 154; 174/101.5

[56] References Cited

U.S. PATENT DOCUMENTS

| 3,696,329 | 10/1972 | Hazelhurst | 367/20 |
|---|---|---|---|
| 3,744,016 | 7/1973 | Davis | 367/20 |
| 4,160,229 | 7/1979 | McGough | 367/20 |
| 4,688,200 | 8/1987 | Poorman et al. | 367/149 |
| 4,692,907 | 9/1987 | Jubinski | 367/20 |
| 4,955,012 | 9/1990 | Bledsoe et al. | 367/20 |

*Primary Examiner*—Ian J. Lobo
*Attorney, Agent, or Firm*—Hitt Chwang & Gaines, PC

[57] ABSTRACT

An air-bladder free hydrophone streamer for use in an aqueous environment and a method of manufacture thereof. The hydrophone streamer includes: (1) data acquisition equipment including data bus interconnecting a plurality of hydrophones, the data acquisition equipment having a specific gravity greater than that of an environmental fluid constituting the aqueous environment, (2) a jacket surrounding the data acquisition equipment, the jacket forming a void about the data acquisition equipment, the jacket having a specific gravity less than that of the environmental fluid and (3) a water-based fill fluid occupying the void, the jacket providing buoyancy for the data acquisition equipment to allow the hydrophone streamer to assume a near-neutral buoyancy with respect to the environmental fluid.

18 Claims, 3 Drawing Sheets

HYDROPHONE STREAMER HAVING WATER-BASED FILL FLUID AND METHOD OF MANUFACTURE THEREOF

CROSS-REFERENCE TO RELATED APPLICATIONS

This application is related to the following U.S. patents:

| Serial/Patent No. | Title | Inventor(s) | Issue Date |
| --- | --- | --- | --- |
| 5,400,298 | TOWED HYDROPHONE STREAMER WITH DISTRIBUTED ELECTRONICS HOUSINGS | John S. Hepp | 3/21/1995 |
| 5,583,824 | TELEMETRY DATA TRANSMISSION CIRCUIT HAVING SELECTABLE CLOCK SOURCE | Durwood Fletcher | 12/10/96 |
| 5,412,621 | ENCAPSULATED HYDROPHONE ELEMENT FOR TOWED HYDROPHONE ARRAY | John S. Hepp | 5/02/1995 |
| 5,450,369 | TELEMETRY TRANSMISSION PROTOCOL FOR TOWED HYDROPHONE STREAMER | Robert H. Mastin, et al. | 9/12/1995 |
| 5,631,874 | TELEMETRY TRANSMISSION PROTOCOL FOR TOWED HYDROPHONE STREAMER | Robert H. Mastin, et al. | 5/20/97 |
| 5,367,499 | VIBRATION ISOLATION MODULE FOR TOWED HYDROPHONE STREAMER | Charles L. Morningstar, et al. | 11/22/1994 |
| 5,523,983 | DUAL ROPE VIBRATION ISOLATION MODULE FOR TOWED HYDROPHONE STREAMER | Charles L. Morningstar, et al. | 6/04/1996 |
| 5,408,442 | HYDROPHONE ELEMENT WITH FILTER CIRCUIT | John S. Hepp | 4/18/1995 |
| 5,592,437 | DATA COLLECTION AND RELAY CIRCUIT FOR TOWED HYDROPHONE ARRAY | Bruce Elliott | 1/7/97 |
| 5,513,151 | TOWED HYDROPHONE STREAMER WITH INTEGRATED MODULE COUPLER | Charles L. Morningstar | 4/30/1996 |
| 5,579,286 | QUIET GEOPHYSICAL CONSTRUCTION PRACTICES FOR REDUCED DIAMETER STREAMERS | John S. Hepp | 11/26/96 |

The above-listed U.S. patents are commonly assigned with the present invention and are incorporated by reference as if reproduced herein in their entirety.

TECHNICAL FIELD OF THE INVENTION

The present invention is directed, in general, to hydrophone streamers and, more particularly, to hydrophone streamers that employ water as a fill fluid and a method of manufacturing the hydrophone streamers.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels back upwardly where it is detected by hydrophone (i.e. microphone) elements in a streamer towed by the vessel to yield information regarding characteristics of the underwater material and structures.

A towed streamer typically comprises a plurality of pressure-sensitive hydrophone elements enclosed within a waterproof hose jacket and electrically coupled to recording equipment onboard the towing vessel. Each hydrophone element within the streamer is designed to convert the mechanical energy present in pressure variations surrounding the hydrophone element into electrical signals. Due to its often extreme length (on the order of kilometers), a streamer is typically divided into a number of separate sections or "modules" that can be decoupled from one another. Data buses running through each of the modules in the streamer carry the electrical signals (so-called "acoustic data") from the hydrophone elements to the recording equipment. Individual streamers may be towed in parallel to create a two dimensional array of hydrophone elements.

Seismic streamers are designed to be towed at a depth of typically 10 meters. To control the depth, streamers are designed to have substantially neutral-buoyancy in the environmental fluid (e.g. sea water) in which they are towed. A slight positive buoyancy may be desired so that a streamer, or streamer module, will float to the surface if it becomes detached, thereby avoiding its loss.

According to Archimedes' principle, a body partially or wholly immersed in a fluid is buoyed up by a force equal to the weight of the fluid which it displaces. The upward buoyant force, however, is counteracted by the downward force of the body due to its weight. Thus, to achieve substantially neutral buoyancy, the weight of the body must be substantially equal to the weight of the fluid displaced by the body. Another way to view this is to recognize that neutral buoyancy will be achieved if the average specific gravity of the body is substantially equal to the specific gravity of the environmental fluid displaced by the body.

The specific gravity, or relative density, of a substance is defined to be the ratio of the mass density of the substance to the mass density of water at a specified temperature (usually specified at 3.98° C., where the density of water is 1000 kg/m$^3$). The mass density ($\rho$), or simply "density," of a material is defined to be the mass (m) of a unit volume (V) of the material, or $\rho$=m/V. Therefore, it can be seen that to decrease the specific gravity of an object the density of the object must be decreased, which can be achieved by either decreasing the mass (for a given volume) or increasing the volume displaced (for a given mass).

Seismic streamers are constructed of many different substances and materials, and thus the specific gravity of a streamer maybe computed as a weighted-average of the specific densities of each of the various components comprising the streamer, such as the hydrophone elements, electronics, hose jacket, and fill fluid. Of course there are local variations in the specific gravity of each module, but the specific gravity distribution over the length of a streamer having many modules can be substantially uniform. Conventional seismic streamers have heretofore used a hydrocarbon-based (e.g., kerosene) fill fluid because of its relatively low specific gravity (<1), which offset the relatively high specific gravity (>1) of the other streamer components, thereby resulting in a streamer having substantially neutral-buoyancy in sea water. There are, however, many disadvantages to using an oil-based fill fluid. First, and foremost, a ruptured hose jacket may result in an oil spill that may cause environmental damage. It may be required that such oil spills be reported under the Clean Water Act, thus tarnishing a company's reputation as an environmentally-responsible corporation and possibly resulting in significant fines and/or lawsuits. Moreover, conventional hydrocarbon-based fill fluids may be both toxic and flammable. It is therefore desirable to eliminate the need for shipboard storage and handling of large amounts of such substances. Furthermore, a loss of the low-specific-gravity oil-based fill fluid results in an increase in the overall specific gravity of the seismic streamer, possibly causing the streamer to sink. Thus, if a streamer module, or a portion of the streamer, becomes severed, the loss of fill fluid could result in the loss of the severed streamer portion.

A further disadvantage of an oil-based fill fluid is that its coefficient of thermal expansion may be significantly different from that of sea water. As first discovered by Galileo, the specific gravity of a liquid changes as it expands at different temperatures. As a seismic streamer is towed through sea water, the temperature of the seismic streamer components will become substantially equal to the temperature of the sea water. Whereas seismic streamers typically use a flexible hose jacket, the hose jacket will thus expand and contract as the fill-fluid expands or contracts as a function of the temperature of the sea water. The variation in diameter of the hose jacket will cause the steamer to displace different volumes of sea water at different temperatures. Because the mass of the streamer does not change, however, the variation in displacement will cause the streamer to have a specific gravity that varies as a function of temperature. It is noted, however, that the specific gravity of sea water also changes as a function of temperature. Thus, if the variation in specific gravity of the streamer is approximately equal to the variation in specific gravity of sea water, as a function of temperature, the net effect on streamer buoyancy is minimized. Therefore, a fill-fluid having a coefficient of thermal expansion substantially equal to that of sea water, and thus a specific gravity that varies with temperature similar to sea water, is more preferable than an oil-based fill-fluid.

From the foregoing, it is recognized that the realization of a seismic streamer that does not require the use of a hydrocarbon-based fill fluid is desirable, and that the most preferable fill-fluid would be substantially composed of water. A seismic streamer using a fill-fluid substantially comprised of water would offer significant advantages over the prior art. Most importantly, a water-based fill fluid would not pose any risks to the environment, nor would it present any toxicity or flammability risks to shipboard personnel. Additionally, if a hose jacket is ruptured, the loss of the water-based fill-fluid would be replaced by sea water which, because of its similar specific gravity, would not affect the buoyancy of the streamer as significantly as it would affect the buoyancy of an oil-filled streamer.

The purpose of any towed array ("streamer") is to sample the pressure field spatially and temporally. The field is quite complex, consisting of signal and noise waves propagating in many directions, all at the characteristic speed of sound in the medium, e.g., seawater. All materials, including those used in streamers, have a characteristic acoustic impedance, and propagation speed, under given conditions. For seawater, the acoustic impedance is about 3571 times that of air. (Urick, "Principles of Underwater Sound," 3rd. Ed., p. 12) In contrast, some polymer materials have an acoustic impedance substantially equal to that of water. Because acoustic waves are locally distorted at impedance boundaries (or impedance gradients), it is desirable to use materials which minimize such distortions in the vicinity of the hydrophone elements of a towed-array streamer.

Previous attempts by those skilled in the art to realize a seismic streamer that uses a water-based fill fluid have not been successful for various reasons. One such effort was based on injecting a highly buoyant syntactic foam (soft urethane imbedded with glass microbeads that trap air) into the hose jacket. Another approach relied on low-density spacers, or air bladders, periodically located along the length of the streamer. As noted hereinabove, whereas the seismic waves reflected from the sea bottom are traveling through sea water, having a certain acoustic impedance, any significant difference in the acoustic impedance of materials through which the waves travel will have the effect of attenuating, or scattering, the waves. Because the acoustic impedance of air is significantly different from the acoustic impedance of sea water, these approaches caused a significant, and unacceptable, reduction in hydrophone sensitivity. Moreover, as a seismic streamer is towed through the water, friction causes traveling waves to be carried along the streamer. The interaction between these traveling waves and steamer components of various acoustic impedances generates noise that may be received by the hydrophone elements, causing distortion of the received seismic data.

As noted above, the specific gravity of an object may be decreased by increasing the volume displaced by the object. Thus, another approach to realizing a water-based fill-fluid seismic streamer would appear to simply be an increase in the diameter of the streamer. This approach, however, is not practical for several reasons. In particular, seismic streamers may be several kilometers long and are stowed on large reels; thus, any increase in hose diameter would significantly decrease the length of streamer that can be stored on a reel.

The increased surface area of a larger diameter hose would also result in greater surface friction, which would cause greater strain on the streamer as it is towed through the water.

Therefore, what is needed in the art is a hydrophone streamer that employs a water-based fill fluid, that does not require air bladders, and that does not suffer from a significantly-increased diameter.

SUMMARY OF THE INVENTION

To address the above-described deficiencies of the prior art, it is a primary object of the present invention to provide a hydrophone streamer that employs a water-based fill fluid and that does not require air bladders and does not suffer from a significantly-increased diameter.

In the attainment of the above primary object, the present invention provides an air-bladder free hydrophone streamer for use in an aqueous environment and a method of manufacture thereof. The hydrophone streamer includes: (1) data acquisition equipment including a data bus interconnecting a plurality of hydrophones, the data acquisition equipment having a specific gravity greater than that of an environmental fluid constituting the aqueous environment, (2) a jacket surrounding the data acquisition equipment, the jacket forming a void about the data acquisition equipment, the jacket having a specific gravity less than that of the environmental fluid and (3) a water-based fill fluid occupying the void, the jacket providing buoyancy for the data acquisition equipment to allow the hydrophone streamer to assume a near-neutral buoyancy with respect to the environmental fluid. As used herein, "air bladder" generally refers to any structure, solid or flexible, designed to retain air, or other gaseous substances, within a cavity for the purpose of providing buoyancy. Furthermore, "data" is defined to include both analog and digital data, and "data acquisition equipment," "data bus," and similar terms are defined to include both analog and digital circuitry.

The present invention is the first to take advantage of a recent advance in urethanes, namely, a urethane material that is lighter than sea water. As described above, previous attempts to produce a water-filled hydrophone streamer have been focussed on decreasing the specific gravity of the data acquisition equipment or on providing air bladders within the hydrophone streamer to compensate for the specific gravity of the equipment and the jacket.

With the new urethanes, developed for entirely different applications, the jacket of the hydrophone streamer may be made light enough to provide sufficient buoyancy to counteract the specific gravity of the equipment. This counter-acting buoyancy allows the fill fluid to be more dense, thereby allowing water to be used without the need for air bladders.

In a preferred embodiment of the present invention, the jacket is composed of a material having a specific gravity less than 1.02. In an embodiment to be illustrated and described, the jacket is composed of a material having a specific gravity less than 1.00 (pure water). Of course, the weighted-average specific gravity of the fill fluid and jacket need only be sufficiently less than the specific gravity of the surrounding environmental fluid to buoy the equipment within the hydrophone streamer.

In a preferred embodiment of the present invention, the environmental fluid is selected from the group consisting of: (1) sea water and (2) brackish water. With a thicker jacket wall or a streamer of greater diameter, it is possible to allow the environmental fluid to be fresh water.

In a preferred embodiment of the present invention, the hydrophone streamer further comprises foam having cells partially occupying the void, the fill fluid occupying the cells. In the embodiment to be illustrated and described, the foam serves to fix the relative locations of various components of the equipment within the hydrophone streamer, and to dampen (attenuate) axial waves in the streamer. Of course, the foam may be replaced with other structures or may be omitted entirely, depending upon the application.

In a preferred embodiment of the present invention, the hydrophone streamer further comprises tension members located about the data acquisition equipment, the tension members having a specific gravity slightly greater than that of the environmental fluid. The tension members are employed to transmit towing forces through the streamer if the streamer is a towed streamer.

In a preferred embodiment of the present invention, the fill fluid is water. In the embodiment to be illustrated and described, fresh water is employed as a readily-available, environmentally safe fill fluid.

In a preferred embodiment of the present invention, the jacket is fluid-resistant. Therefore, the jacket serves as an impervious layer to prevent the environmental fluid from commingling with the fill fluid. Such commingling would generally serve to increase the specific gravity of the hydrophone streamer as a whole.

In a preferred embodiment of the present invention, the data acquisition equipment further includes a plurality of data processing and transmission units located along a length of the hydrophone streamer. The units, located in cans, further increase the specific gravity of the hydrophone streamer, the relatively-low specific gravity of the jacket helping to compensate for this increase in specific gravity.

In a preferred embodiment of the present invention, the jacket is composed of SANTOPRENE. SANTOPRENE is commercially available from Advanced Elastomer Systems of Akron, Ohio. Other jacket materials that have a lower specific gravity from that of the surrounding environmental fluid are within the scope of the present invention.

In a preferred embodiment of the present invention, the hydrophone streamer is formed of a plurality of separate modules. In the embodiment to be illustrated and described, the separate modules allow the streamer to be lengthened or shortened as desired. Of course, the hydrophone streamer can be comprised of a single unit or a single module.

The foregoing has outlined rather broadly the features and technical advantages of the present invention so those of ordinary skill in the art will better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
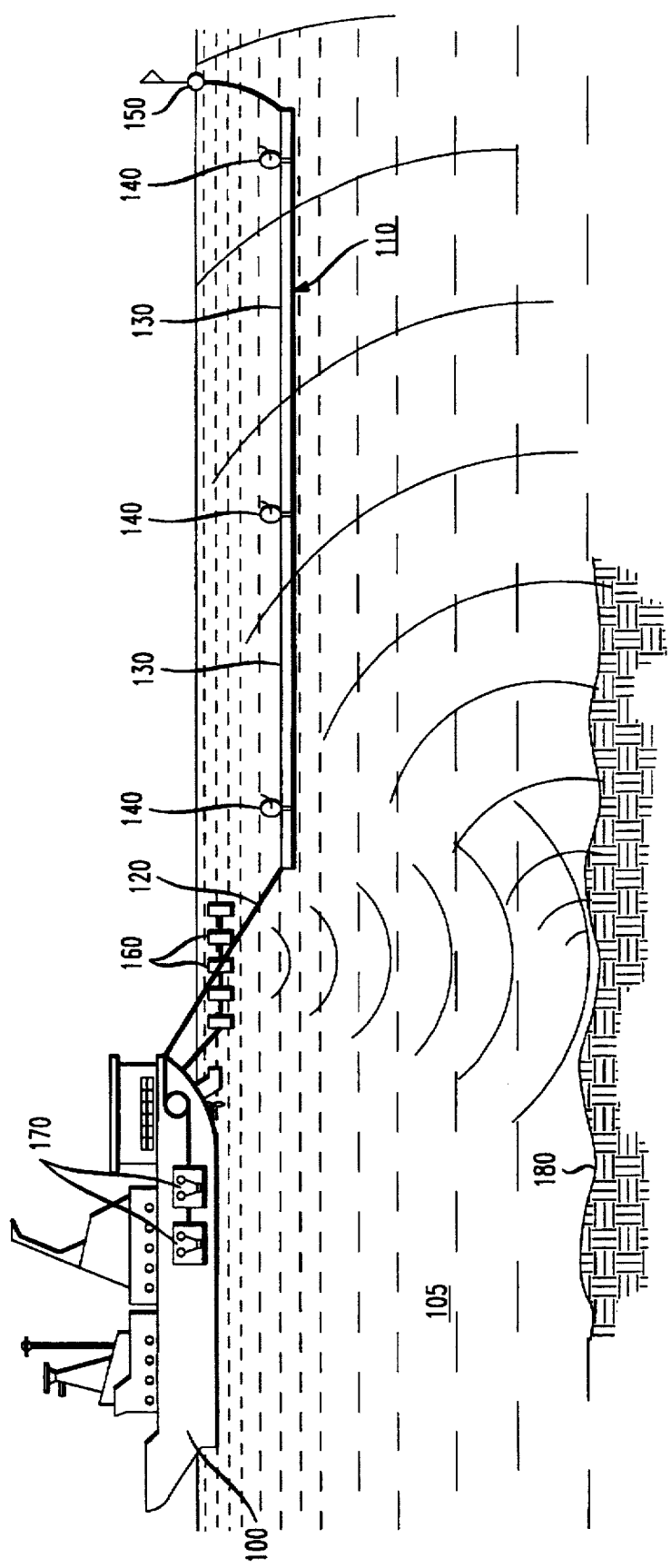
FIG. 1 illustrates an elevational view representing a towed array in operation.

Referring initially to FIG. 1, illustrated is an elevational view representing a towed array in operation. A seismic exploration vessel 100 tows at least one streamer 110 behind it by way of a tow cable 120. Streamer 110 is towed through environmental fluid 105, that is preferably composed of an aqueous fluid such as sea water, brackish water, or fresh water. Streamer 110 may also include rear buoy 150 if necessary. Streamer 110 may additionally be provided with one or more leveling devices or "birds" 140 which serve to regulate the depth of streamer 110 within environmental fluid 105. Vessel 100 also tows compressed air guns 160, or other sources of acoustic energy, which generate an acoustic wave in environmental fluid 105 which travels downwardly, as shown, until reflected at interfaces within sea bed 180 and then detected by the hydrophones of streamer 110. Analog signals generated by the hydrophones within streamer 110, upon receipt of the reflected wave, maybe converted to digital form by analog-to-digital converters (not shown) and transmitted along streamer 110 and up tow cable 120 to be processed and stored by digital recording devices 170 on board vessel 100. Streamer 110 may include a plurality of modules 130. Each module 130 includes a plurality of hydrophone assemblies (individually referenced in FIG. 2). Modules 130 are connectible to each other in various numbers to make streamer 110 any length desired, up to a practical maximum length.

Figure 2:
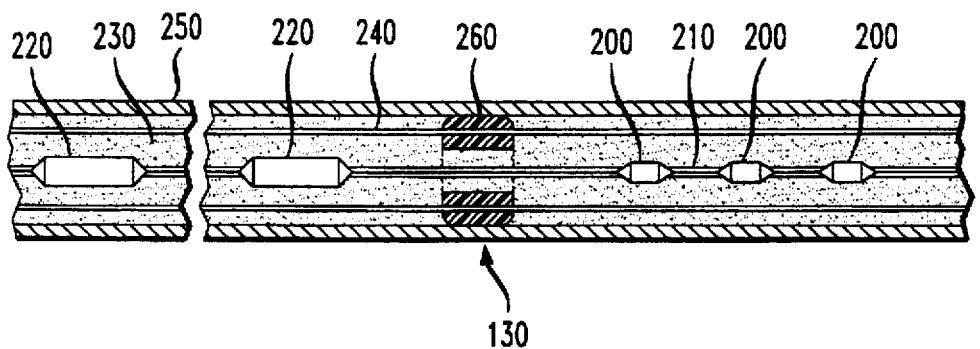
FIG. 2 illustrates a partial cross-sectional view of a typical module 130 of FIG. 1.

Turning now to FIG. 2, illustrated is a partial cross-sectional view of a typical module 130 of FIG. 1. Module 130 comprises a plurality of hydrophone assemblies 200 joined to each other by data bus 210. Data bus 210 feeds into various data acquisition equipment 220 spread along a length of module 130. Open-cell foam 230 and tensioning cables 240 reside within waterproof jacket 250. Spacers 260, made of a polyurethane having a specific gravity greater than one, are bonded to tension cables 240 at intervals within module 130. The spacers 260 and foam 230 longitudinally fix the locations of other components, such as data acquisition equipment 220, within module 130. Tension cables 240 are used to carry pulling forces generated by vessel 100 and transmitted down the towed array while it is under tow, thereby relieving cables 210, jacket 250 and other structures within jacket 250 from this stress. Jacket 250 surrounds data acquisition equipment 220 forming a void thereabout and, according to the principles of the present invention, has a specific gravity less than that of environmental fluid 105. Foam 230 laterally suspends hydrophone assemblies 200 and data acquisition equipment 220 therein and provides a surface suitable for longitudinally fixing data acquisition equipment 220 in a relatively stable spaced-apart relationship along the length of module 130. Maintenance of this spaced-apart relationship is important to proper operation of the array because the phase of signals produced by hydrophone assemblies 200 in response to pressure wave impingement is a function of hydrophone spacing.

According to the principles of the present invention, a fill fluid (not shown) having a certain desired specific gravity is entrained within open cell foam 230 and any other voids within jacket 250. This fill fluid is chosen such that, when taken as a whole, module 130 is filled to a cylindrical shape and has a certain desired specific gravity that results in near neutral buoyancy with respect to the environmental fluid 105, thereby minimizing the leveling work done by birds 140 and the resulting turbulence noise. Traditionally, the entrained fill fluid is an aliphated hydrocarbon, although many other fluids have been considered. The specific gravity of the fill fluid is of primary concern. The fill fluid should also not materially alter the pressure wave impinging on the streamer; i.e., the acoustic impedance of the fill fluid should be substantially equal to the acoustic impedance of the environmental fluid. Finally, the fill fluid should be relatively chemically inert, such that the fluid does not harm components within the streamer or cause environmental damage if it escapes from the streamer.

As noted above, as the fill-fluid expands or contracts as a function of the temperature of environmental fluid 105, flexible jacket 250 will expand or contract. The variation in diameter of jacket 250 will cause streamer 110 to displace different volumes of environmental fluid 105 at different temperatures. Because the mass of streamer 110 does not change, however, the variation in displacement will cause streamer 110 to have a specific gravity that varies as a function of the temperature of environmental fluid 105 through which streamer 110 is towed. If the variation in specific gravity of streamer 110 is approximately equal to the variation in specific gravity of environmental fluid 105, however, the net effect on the buoyancy of streamer 110 will be minimized. Therefore, a fill-fluid having a specific gravity that varies with temperature similar to that of environmental fluid 105 is preferred.

Figure 3:
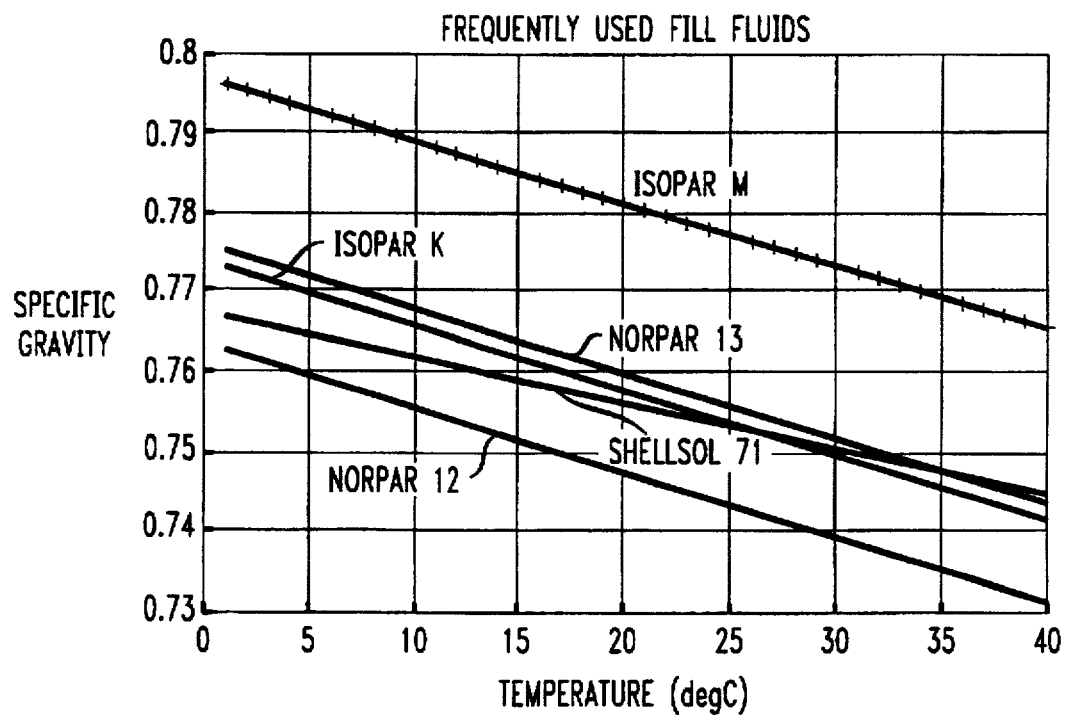
FIG. 3 illustrates a graph of the specific gravity, as a function of temperature, for different hydrocarbon-based fill fluids.
Figure 4:
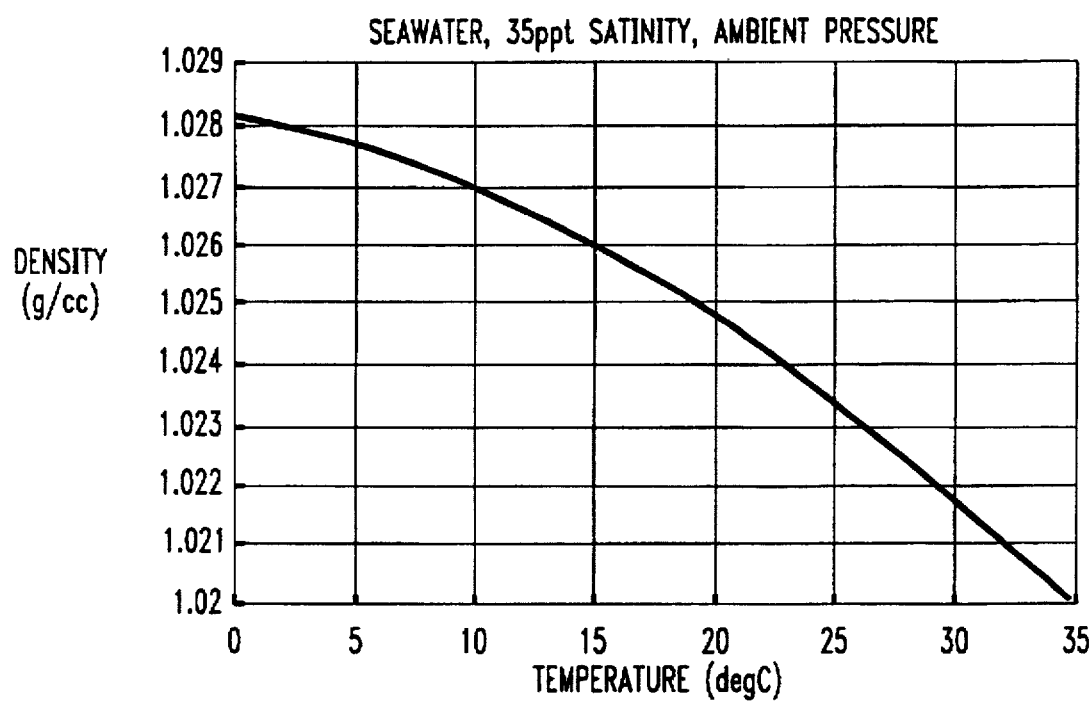
FIG. 4 illustrates a graph of the specific gravity, as a function of temperature, for common seawater.

Turning now to FIG. 3, illustrated is a graph of the specific gravity, as a function of temperature, for exemplary hydrocarbon-based fluids frequently-used as seismic streamer fill-fluids. It can be noted that the specific gravities of ISOPAR M, ISOPAR K, NORPAR 12, and NORPAR 13 (all available from Exxon Corporation) vary as a function of temperature. For each of these fluids, the specific gravity varies by approximately 0.021 over the temperature range of 5° to 30° Celsius. Turning now to FIG. 4, illustrated is a graph of the density, as a function of temperature, for common sea water. (Whereas the specific gravity of a substance is defined to be the ratio of the density of the substance to the density of water, which is 1 g/cc at 3.98° C., those skilled in the art will recognize that the specific gravity of seawater is approximately equal to its density.) It can be seen that the specific gravity of sea water only varies by approximately 0.00595 over the temperature range of 5° to 30° Celsius and, thus, the variation in specific gravity of the frequently-used hydrocarbon-based fill fluids significantly exceeds the variation in specific gravity of sea water by a factor of approximately 3.53 (0.021/0.00595).

Typically, seismic streamers are used to explore for subsea mineral deposits. When environmental fluid 105 is sea water, the disparity between the specific gravity for a hydrocarbon-based fill fluid and the specific gravity of sea water, over a broad range of operating temperatures, will cause the buoyancy of streamer 110 to vary as a function of water temperature. Thus, it may be necessary that fill fluid, or other ballast means (e.g., external weights), be added to, or removed from, a streamer depending on the temperature of the operating environment. As noted above, however, if the fill fluid has a specific gravity substantially equal to the specific gravity of sea water, the net effect on the buoyancy of streamer 110 will be minimized. Therefore, a water-based fill fluid having a specific gravity that varies with temperature similar to sea water is preferred.

A water-based fill fluid will have a specific gravity greater than most hydrocarbon-based fill fluids. Because the substitution of a water-based fill fluid for a conventional hydrocarbon-based fill fluid has the undesirable result of increasing the average specific gravity of the streamer, thus making the streamer less buoyant, the substitution is non-trivial. As noted above, prior attempts by those skilled in the art to realize a seismic streamer that uses a water-based fill fluid have not been successful. In particular, the use of low-density spacers, or air bladders, having a different acoustic impedance than sea water resulted in a significant, and unacceptable, reduction in acoustic performance. Thus, it is an objective of the present invention to provide an air-bladder-free hydrophone streamer that uses a water-based fill fluid. To compensate for the greater specific gravity of a water-based fill fluid, the seismic streamer disclosed herein is the first to take advantage of a recent advance in urethanes; namely, urethane materials characterized by a specific gravity less than that of sea water.

In a preferred embodiment of the present invention, jacket 250 is composed of SANTOPRENE, a urethane material commercially available from Advanced Elastomer Systems of Akron, Ohio. SANTOPRENE is fluid-resistant and serves as an impervious layer to prevent environmental fluid 105 from commingling with the fill fluid. In a preferred embodiment the fill fluid is pure water and environmental fluid 105 is sea water and, thus, such commingling would generally serve to increase the specific gravity of hydrophone streamer 110 as a whole. The principal characteristic of SANTOPRENE making it suitable for application in the present invention is that its specific gravity is less than the specific gravity of sea water (approximately 1.02 g/cc at 35° Celsius), which is the typical environmental fluid 105 in which seismic streamers are employed. Other jacket materials that have a lower specific gravity from that of the environmental fluid in which they are to be employed, however, are within the scope of the present invention.

From the above, it is apparent that the present invention provides an air-bladder free hydrophone streamer for use in an aqueous environment and a method of manufacture thereof. The hydrophone streamer includes: (1) data acquisition equipment including data bus interconnecting a plurality of hydrophones, the data acquisition equipment having a specific gravity greater than that of an environmental fluid constituting the aqueous environment, (2) a jacket surrounding the data acquisition equipment, the jacket forming a void about the data acquisition equipment, the jacket having a specific gravity less than that of the environmental fluid and (3) a water-based fill fluid occupying the void, the jacket providing buoyancy for the data acquisition equipment to allow the hydrophone streamer to assume a near-neutral buoyancy with respect to the environmental fluid.

Although the present invention and its advantages have been described in detail, those of ordinary skill in the art should understand that various changes, substitutions and alterations can be made herein without departing from the spirit and scope of the invention in its broadest form.

What is claimed is:

1. An air-bladder free hydrophone streamer for use in an aqueous environment, comprising:
    data acquisition equipment including a data bus interconnecting a plurality of hydrophones, said data acquisition equipment having a specific gravity greater than that of an environmental fluid constituting said aqueous environment;
    a jacket surrounding said data acquisition equipment, said jacket forming a void about said data acquisition equipment, said jacket having a specific gravity less than that of said environmental fluid; and
    a water-based fill fluid occupying said void, said jacket providing buoyancy for said data acquisition equipment to allow said hydrophone streamer to assume a near-neutral buoyancy with respect to said environmental fluid.

2. The hydrophone streamer as recited in claim 1 wherein said jacket is composed of a material having a specific gravity less than 1.02.

3. The hydrophone streamer as recited in claim 1 wherein said environmental fluid is selected from the group consisting of:
    sea water, and
    brackish water.

4. The hydrophone streamer as recited in claim 1 further comprising foam having cells partially occupying said void, said fill fluid occupying said cells.

5. The hydrophone streamer as recited in claim 1 further comprising tension members located about said data acquisition equipment, said tension members having a specific gravity greater than that of said environmental fluid.

6. The hydrophone streamer as recited in claim 1 wherein said fill fluid is water.

7. The hydrophone streamer as recited in claim 1 wherein said jacket is fluid-resistant.

8. The hydrophone streamer as recited in claim 1 wherein said data acquisition equipment further includes a plurality of data processing and transmission units located along a length of said hydrophone streamer.

9. The hydrophone streamer as recited in claim 1 wherein said hydrophone streamer is formed of a plurality of separate modules.

10. A method of manufacturing an air-bladder free hydrophone streamer for use in an aqueous environment, comprising the steps of
    providing data acquisition equipment including data bus interconnecting a plurality of hydrophones, said data acquisition equipment having a specific gravity greater than that of an environmental fluid constituting said aqueous environment;
    surrounding said data acquisition equipment with a jacket, said jacket forming a void about said data acquisition equipment, said jacket having a specific gravity less than that of said environmental fluid; and
    filling said void with a water-based fill fluid, said jacket providing buoyancy for said data acquisition equipment to allow said hydrophone streamer to assume a near-neutral buoyancy with respect to said environmental fluid.

11. The method as recited in claim 10 wherein said jacket is composed of a material having a specific gravity less than 1.02.

12. The method as recited in claim 10 wherein said environmental fluid is selected from the group consisting of:
    sea water, and
    brackish water.

13. The method as recited in claim 10 further comprising the step of partially filling said void with foam having cells, said fill fluid occupying said cells.

14. The method as recited in claim 10 further comprising the step of locating tension members about said data acquisition equipment, said tension members having a specific gravity greater than that of said environmental fluid.

15. The method as recited in claim 10 wherein said fill fluid is water.

16. The method as recited in claim 10 wherein said jacket is fluid-resistant.

17. The method as recited in claim 10 wherein said step of providing comprises the step of locating a plurality of data processing and transmission units along a length of said hydrophone streamer.

18. The method as recited in claim 10 further comprising the step of forming said hydrophone streamer of a plurality of separate modules.

* * * * *